(12) United States Patent
Cheng

(10) Patent No.: US 11,799,858 B2
(45) Date of Patent: *Oct. 24, 2023

(54) NETWORK ENTITY ID AAA

(71) Applicant: Palo Alto Networks, Inc., Santa Clara, CA (US)

(72) Inventor: Gong Cheng, Sunnyvale, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,316

(22) Filed: Feb. 3, 2022

(65) Prior Publication Data

US 2022/0159001 A1 May 19, 2022

Related U.S. Application Data

(63) Continuation of application No. 16/889,355, filed on Jun. 1, 2020, now Pat. No. 11,290,455.

(60) Provisional application No. 62/854,967, filed on May 30, 2019.

(51) Int. Cl.
*H04L 9/40* (2022.01)

(52) U.S. Cl.
CPC ...... *H04L 63/0892* (2013.01); *H04L 63/1408* (2013.01)

(58) Field of Classification Search
CPC .. H04L 63/0892; H04L 63/1408; H04L 63/20
See application file for complete search history.

(56) References Cited

U.S. PATENT DOCUMENTS

| 7,853,708 | B2 | 12/2010 | Townsley | |
|---|---|---|---|---|
| 2005/0254651 | A1* | 11/2005 | Porozni | H04W 12/08 380/270 |
| 2007/0107047 | A1 | 5/2007 | Mukherjee | |
| 2011/0055907 | A1 | 3/2011 | Narasimhan | |
| 2016/0173495 | A1 | 6/2016 | Joo | |
| 2021/0021645 | A1 | 1/2021 | Marfia | |

OTHER PUBLICATIONS

Koo (Device Identification Interoperability in Heterogeneous IoT Platforms, retrieved Dec. 20, 2022 from https://www.mdpi.com/1424-8220/19/6/1433) (Year: 2019).*
Metz (AAA protocols: authentication, authorization, and accounting for the Internet, 1999, https://ieeexplore.ieee.org/abstract/document/807015, retrieved Feb. 10, 2023) (Year: 1999).*
Sivanathan et al.. Classifying IoT Devices in Smart Environments Using Network Traffic Characteristics, IEEE, TMC, No. 8, pp. 1745-1759, Aug. 2018.

* cited by examiner

*Primary Examiner* — Brian F Shaw
(74) *Attorney, Agent, or Firm* — Van Pelt, Yi & James LLP

(57) ABSTRACT

A set of data packets transmitted by an IoT device is received at a system. At least one packet included in the set of data packets is analyzed. An Authentication, and Account (AAA) message, including contextual information associated with the IoT device, is transmitted on behalf of the IoT device.

27 Claims, 5 Drawing Sheets

300

```
Code = Access-Request (1)
ID = x
Length = xx
Request Authenticator
    Attributes:
        Calling-Station-Id = "00:12:67:11:22:33"
        Framed-IP-Address = "10.10.10.1"
        NAS-IP-Address = <zingbox sensor IP>
```

FIG. 4A

```
Code = Access-Request (1)
ID = x
Length = xx
Request Authenticator
    Attributes:
        Calling-Station-Id = "00:12:67:11:22:33"
        Framed-IP-Address = "10.10.10.1"
    Framed-IP-Address = <zingbox sensor IP>
Zingbox-Device-Profiles = "Panasonic Panboard"
Zingbox-Device-Category = "Interactive Whiteboard"
Zingbox-Device-Type = "Office"
Zingbox-Device-Vendor = "Panasonic Corporation"
```

FIG. 4B

```
Code = Access-Request (1)
ID = xx
Length = xx
Request Authenticator
    Attributes:
        Calling-Station-Id = "00:12:67:11:22:33"
        Framed-IP-Address = "10.10.10.1"
        NAS-IP-Address = <zingbox sensor IP>
        Zingbox-Device-Profiles = "Panasonic Panboard"
        Zingbox-Device-Category = "Interactive Whiteboard"
        Zingbox-Device-Type = "Office"
        Zingbox-Device-Vendor = "Panadonic Corporation"
        Zingbox-Device-Model = "KX-B430"
        Zingbox-Device-OS-Group = "Linux"
        Zingbox-Device-OS-Ver = "3.16"
```

FIG. 4C

NETWORK ENTITY ID AAA

CROSS REFERENCE TO OTHER APPLICATIONS

This application is a continuation of U.S. patent application Ser. No. 16/889,355, entitled NETWORK ENTITY ID AAA filed Jun. 1, 2020, which claims priority to U.S. Provisional Patent Application No. 62/854,967, entitled NETWORK ENTITY ID AAA filed May 30, 2019, each of which is incorporated herein by reference for all purposes.

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer and can perform additional nefarious tasks (e.g., exfiltrating sensitive data, propagating to other systems, etc.). A variety of approaches can be used to harden computers against such and other compromises. Unfortunately, existing approaches to protecting computers are not necessarily suitable in all computing environments. Further, malware authors continually adapt their techniques to evade detection, and an ongoing need exists for improved techniques to detect malware and prevent its harm in a variety of situations.

BRIEF DESCRIPTION OF THE DRAWINGS

Various embodiments of the invention are disclosed in the following detailed description and the accompanying drawings.

FIGS. 4A-4C illustrate examples of RADIUS messages sent by an IoT server to a AAA server on behalf of an IoT device in various embodiments.

DETAILED DESCRIPTION

Figure 1:
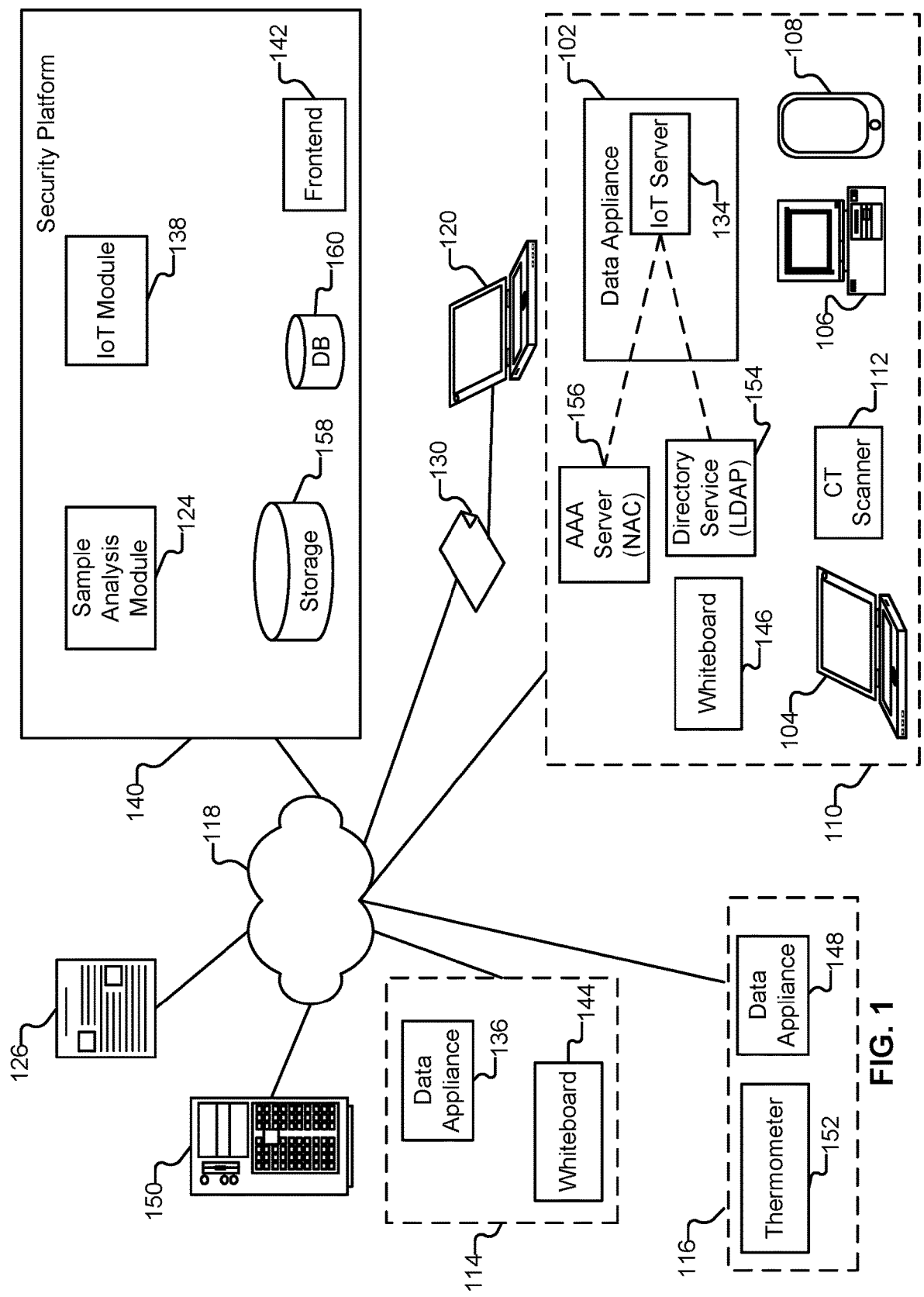
FIG. 1 illustrates an example of an environment in which malicious activity is detected and its harm reduced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which malicious activity is detected and its harm reduced. In the example shown in FIG. 1, client devices 104-108 are a laptop computer, a desktop computer, and a tablet (respectively) present in an enterprise network 110 of a hospital (also referred to as "Acme Hospital"). Data appliance 102 is configured to enforce policies regarding communications between client devices, such as client devices 104 and 106, and nodes outside of enterprise network 110 (e.g., reachable via external network 118).

Examples of such policies include ones governing traffic shaping, quality of service, and routing of traffic. Other examples of policies include security policies such as ones requiring the scanning for threats in incoming (and/or outgoing) email attachments, web site content, files exchanged through instant messaging programs, and/or other file transfers. In some embodiments, data appliance 102 is also configured to enforce policies with respect to traffic that stays within enterprise network 110.

Network 110 also includes a directory service 154 and an Authentication, Authorization, and Accounting (AAA) server 156. In the example shown in FIG. 1, directory service 154 (also referred to as an identity provider or domain controller) makes use of the Lightweight Directory Access Protocol (LDAP) or other appropriate protocols. Directory service 154 is configured to manage user identity and credential information. One example of directory service 154 is a Microsoft Active Directory server. Other types of systems can also be used instead of an Active Directory server, such as a Kerberos-based system, and the techniques described herein adapted accordingly. In the example shown in FIG. 1, AAA server 156 is a network admission control (NAC) server. AAA server 156 is configured to authenticate wired, wireless, and VPN users and devices to a network, evaluate and remediate a device for policy compliance before permitting access to the network, differentiate access based on roles, and then audit and report on who is on the network. One example of AAA server 156 is a Cisco Identity Services Engine (ISE) server that makes of the Remote Authentication Dial-In User Service (RADIUS). Other types of AAA servers can be used in conjunction with the techniques described herein, including ones that use protocols other than RADIUS.

In various embodiments, data appliance 102 is configured to listen to communications (e.g., passively monitor messages) to/from directory service 154 and/or AAA server 156. In various embodiments, data appliance 102 is configured to communicate with (i.e., actively communicate messages with) directory service 154 and/or AAA server 156. In various embodiments, data appliance 102 is configured to communicate with an orchestrator (not pictured) that communicates with (e.g., actively communicates messages with) various network elements such as directory service 154 and/or AAA server 156. Other types of servers can also be included in network 110 and can communicate with data appliance 102 as applicable, and directory service 154 and/or AAA server 156 can also be omitted from network 110 in various embodiments.

While depicted in FIG. 1 as having a single data appliance 102, a given network environment (e.g., network 110) can include multiple embodiments of data appliances, whether operating individually or in concert. Similarly, while the term "network" is generally referred to herein for simplicity in the singular (e.g., as "network 110"), the techniques described herein can be deployed in a variety of network environments of various sizes and topologies, comprising various mixes of networking technologies (e.g., virtual and physical), using various networking protocols (e.g., TCP and UDP) and infrastructure (e.g., switches and routers) across various network layers, as applicable.

Data appliance 102 can be configured to work in cooperation with a remote security platform 140. Security platform 140 can provide a variety of services, including performing static and dynamic analysis on malware samples (e.g., via sample analysis module 124), and providing a list of signatures of known-malicious files, domains, etc. to data appliances, such as data appliance 102 as part of a subscription. As will be described in more detail below, security platform 140 can also provide information (e.g., via IoT module 138) associated with the discovery, classification, management, etc. of IoT devices present within a network such as network 110. In various embodiments, signatures, results of analysis, and/or additional information (e.g., pertaining to samples, applications, domains, etc.) are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives or other storage 158, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As examples, security platform 140 can perform static/dynamic analysis (e.g., via sample analysis module 124) and/or IoT device functionality (e.g., via IoT module 138) in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140, but may also be provided by a third party. As one example, the virtual machine server can rely on EC2, with the remainder portions of security platform 140 provided by dedicated hardware owned by and under the control of the operator of security platform 140.

Figure 2A:
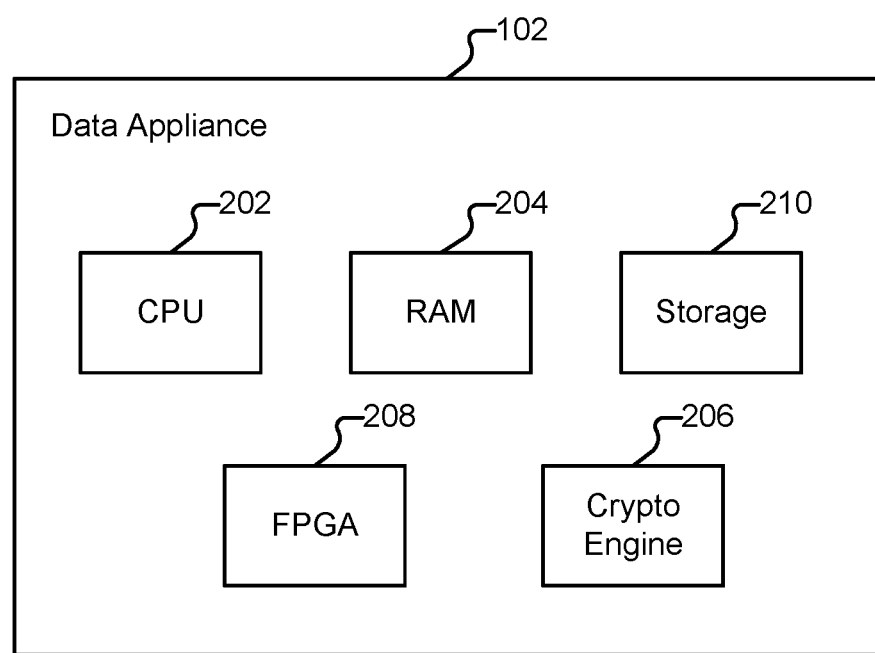
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 110 and implementing disclosed techniques. Examples of such information include application identifiers, content identifiers, user identifiers, requested URLs, IP address mappings, policy and other configuration information, signatures, hostname/URL categorization information, malware profiles, machine learning models, IoT device classification information, etc. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. A given network environment may include multiple data appliances, each of which may be configured to provide services to a particular portion or portions of a network, may cooperate to provide services to a particular portion or portions of a network, etc. The functionality provided by data appliance 102 can also be integrated into or executed as software on a general purpose computer, a computer server, a gateway, and/or a network/routing device. In some embodiments, at least some functionality described as being provided by data appliance 102 are instead (or in addition) provided to a client device (e.g., client device 104 or client device 106) by software executing on the client device. Functionality described herein as being performed by data appliance 102 can also be performed at least partially by or in cooperation with security platform 140, and/or functionality described herein as being performed by security platform 140 can also be performed at least partially by or in cooperation with data appliance 102, as applicable. As one example, various functionality described as being performed by IoT module 138 can be performed by embodiments of IoT server 134.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on. Another example of a component included in data appliance 102 in various embodiments is an IoT server 134, described in more detail below. IoT server 134 can take a variety of forms, including as a standalone server (or set of servers), whether physical or virtualized, and can also be collocated with/incorporated into data appliance 102 as applicable (e.g., as shown in FIG. 1).

Figure 2B:
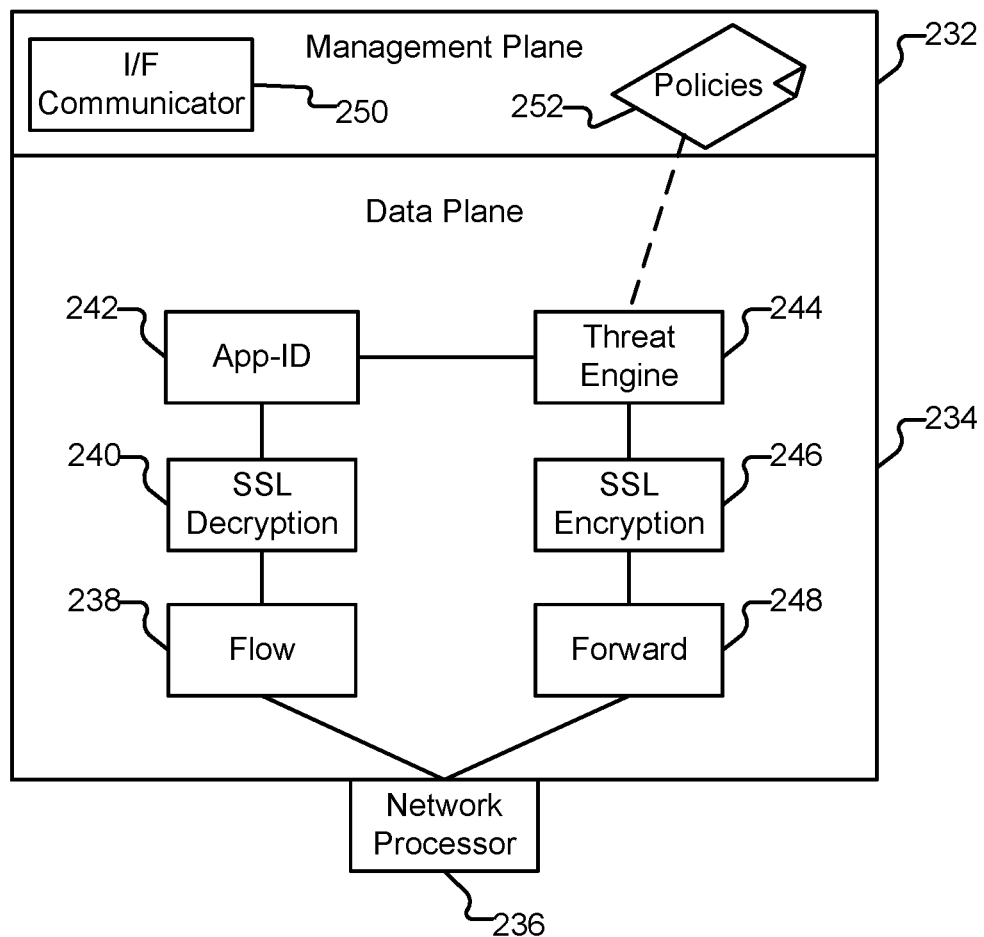
FIG. 2B is a functional diagram of logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms). Policies 252 can also include policies for managing communications involving IoT devices.

Returning to FIG. 1, suppose that a malicious individual (e.g., using system 120) has created malware 130. The malicious individual hopes that vulnerable client devices will execute a copy of malware 130, compromising the client device, and causing the client device to become a bot in a botnet. The compromised client device can then be instructed to perform tasks (e.g., cryptocurrency mining, participating in denial of service attacks, and propagating to other vulnerable client devices) and to report information or otherwise exfiltrate data to an external entity (e.g., command and control (C&C) server 150), as well as to receive instructions from C&C server 150, as applicable.

Some client devices depicted in FIG. 1 are commodity computing devices typically used within an enterprise organization. For example, client devices 104, 106, and 108 each execute typical operating systems (e.g., macOS, Windows, Linux, Android, etc.). Such commodity computing devices are often provisioned and maintained by administrators (e.g., as company-issued laptops, desktops, and tablets, respectively) and often operated in conjunction with user accounts (e.g., managed via by a directory service provider (also referred to as a domain controller) configured with user identity and credential information). As one example, an employee Alice might be issued laptop 104 which she uses to access her ACME-related email and perform various ACME-related tasks. Other types of client devices (referred to herein generally as Internet of Things or IoT devices) are increasingly also present in networks and are often "unmanaged" by the IT department. Some such devices (e.g., teleconferencing devices) may be found across a variety of different types of enterprises (e.g., as IoT whiteboards 144 and 146) and such devices may also be vertical specific. For example, infusion pumps and computerized tomography scanners (e.g., CT scanner 112) are examples of IoT devices that may be found within a healthcare enterprise network (e.g., network 110), and robotic arms are an example of devices that may be found in a manufacturing enterprise network. Further, consumer-based IoT devices (e.g., cameras) may also be present in an enterprise network. As with commodity computing devices, IoT devices present within a network may communicate with resources that are both internal or external to such networks.

As with commodity computing devices, IoT devices are a target of nefarious individuals. Unfortunately, the presence of IoT devices in a network can present several unique security/administrative challenges. IoT devices are often low-power devices or special purpose devices and are often deployed without the knowledge of network administrators. Even where known to such administrators, it may not be possible to install endpoint protection software or agents on IoT devices. IoT devices may be managed by and communicate solely/directly with third party cloud infrastructure (e.g., with industrial thermometer 152 communicating directly with cloud infrastructure 126) using proprietary (or otherwise non-standard) protocols. This can confound attempts to monitor network traffic in and out of such devices to make decisions about when a threat or attack is happening against the device. Further, some IoT devices (e.g., in a healthcare environment) are mission critical (e.g., a network connected surgical system). Unfortunately, compromise of an IoT device (e.g., by malware 130) or the misapplication of security policies against traffic associated with an IoT device can have potentially catastrophic implications. Using techniques described herein, the security of heterogeneous networks that include IoT devices can be improved and the harms posed to such networks can be reduced.

In various embodiments, data appliance 102 includes an IoT server 134. IoT server 134 is configured to identify IoT devices within a network (e.g., network 110). Such identification can be used, e.g., by data appliance 102, to help make and enforce policies regarding traffic associated with IoT devices, and to enhance the functionality of other elements of network 110 (e.g., providing contextual information to AAA 156). In various embodiments, IoT server 134 incorporates one or more network sensors configured to passively sniff/monitor traffic. One example way to provide such network sensor functionality is as a tap interface or switch mirror port. Other approaches to monitoring traffic can also be used (in addition or instead) as applicable.

In various embodiments, IoT server 134 is configured to provide log or other data (e.g., collected from passively monitoring network 110) to IoT module 138. One example way of implementing IoT module 138 is using a microservices-based architecture. IoT module 138 can also be implemented using different programming languages, databases, hardware, and software environments, as applicable, and/or as services that are messaging enabled, bounded by contexts, autonomously developed, independently deployable, decentralized, and built and released with automated processes. One task performed by IoT module 138 is to identify IoT devices in the data provided by IoT server 134 (and provided by other embodiments of data appliances such as data appliance 136 and 148) and to provide additional contextual information about those devices (e.g., back to the respective data appliances).

III. Network Entity ID AAA

Suppose, as was previously mentioned, Alice was issued a laptop 104 by ACME. Various components of network 110 will cooperate to authenticate Alice's laptop as she uses it to access various resources. As one example, when Alice connects laptop 104 to a wireless access point located within network 110 (not pictured), the wireless access point may communicate (whether directly or indirectly) with AAA server 156 while provisioning network access. As another example, when Alice uses laptop 104 to access her ACME email, laptop 104 may communicate (whether directly or indirectly) with directory service 154 while fetching her inbox, etc. As a commodity laptop running a commodity operating system, laptop 104 is able to generate appropriate AAA messages (e.g., RADIUS client messages) which will help laptop 104 gain access to the appropriate resources it needs.

As previously mentioned, one problem posed by IoT devices (e.g., device 146) in a network such as 110 is that such devices are often "unmanaged" (e.g., not configured, provisioned, managed by network administrators, etc.), do not support protocols such as RADIUS, and thus cannot be integrated with AAA services such as other devices such as laptop 104. A variety of approaches can be adopted to provide IoT devices with network access within network 110, each of which has drawbacks. One option is for ACME to limit IoT devices to use of a guest network (e.g., via a pre-shared key). Unfortunately, this can limit the utility of the IoT if it is unable to communicate with other nodes within network 110 to which it should legitimately have access. Another option is to allow IoT devices unlimited access to network 110, mitigating the security benefits of having a segmented network. Yet another option is for ACME to manually specify rules that govern how a given IoT device should be able to access resources in network 110. This approach is generally untenable/unworkable for a variety of reasons. As one example, administrators may often not be involved in the deployment of IoT devices and thus will not know that policies for such devices should be included (e.g., in data appliance 102). Even where administrators might, e.g., manually configure policies for specific IoT devices in appliance 102 (e.g., for devices such as device 112), keeping such policies up to date is error prone and is generally untenable given the sheer number of IoT devices that might be present in network 110. Further, such policies will likely be simplistic (e.g., assigning CT scanner 112 by IP address and/or MAC address to a particular network) and not allow for finer grained control over connections/policies involving CT scanner 112 (e.g., dynamically including with policies applicable to surgical devices vs. point of sales terminals). Further, even where CT scanner 112 is manually included in data appliance 102, as previously mentioned, IoT devices will generally not support technologies such as RADIUS, and the benefits in having such AAA servers manage CT scanner 112's networking access will be limited as compared to other types of devices (e.g., laptop 104) which more fully support such technologies. As will be described in more detail below, in various embodiments, data appliance 102 (e.g., via IoT server 134) is configured to provide support for AAA functionality to IoT devices present in network 110 in a passive manner.

In the following discussion, suppose that Alice's department in ACME has recently purchased an interactive whiteboard 146 so that Alice can collaborate with other ACME employees as well as individuals outside of ACME (e.g., Bob, a researcher at Beta University having its own network 114, data appliance 136, and whiteboard 144). As part of the initial setup of whiteboard 146, Alice connects it to a power source and provides it with a wired connection (e.g., to an outlet in the conference room) or wireless credentials (e.g., the credentials for use by visitors of the conference room). When whiteboard 146 provisions a network connection, IoT server 134 (e.g., via a mechanism such as a network sensor as described above) will recognize whiteboard 146 as a new device within network 110. One action taken in response to this detection is to communicate with security platform 140 (e.g., creating a new record for whiteboard 146 in database 160 and retrieving any currently available contextual information associated with whiteboard 146 (e.g., obtaining the manufacturer of whiteboard 146, model of whiteboard 146, etc.)). Any contextual information provided by security platform 140 can be provided to (and stored at) data appliance 102 which can in turn provide it to directory service 154 and/or AAA server 156 as applicable. As applicable, IoT module 138 can provide updated contextual information about whiteboard 146 to data appliance 102 as it becomes available. And, data appliance 102 (e.g., via IoT server 134)

can similarly provide security platform 140 with ongoing information about whiteboard 146. Examples of such information include observations about whiteboard 146's behaviors on network 110 (e.g., statistical information about the connections it makes) which can be used by security platform 140 to build behavioral profiles for devices such as whiteboard 146. Similar behavior profiles can be built by security platform 140 for other devices (e.g., whiteboard 144). Such profiles can be used for a variety of purposes, including detecting anomalous behaviors. As one example, data appliance 148 can use information provided by security platform 140 to detect whether thermometer 152 is operating anomalously as compared to historic observations of thermometer 152, and/or as compared to other thermometers (not pictured) of a similar model, manufacturer, or more generally, including thermometers present in other networks. If anomalous behavior is detected (e.g., by data appliance 148), appropriate remedial action can be automatically taken, such as restricting thermometer 152's access to other nodes on network 116, generating an alert, etc.

Figure 3:
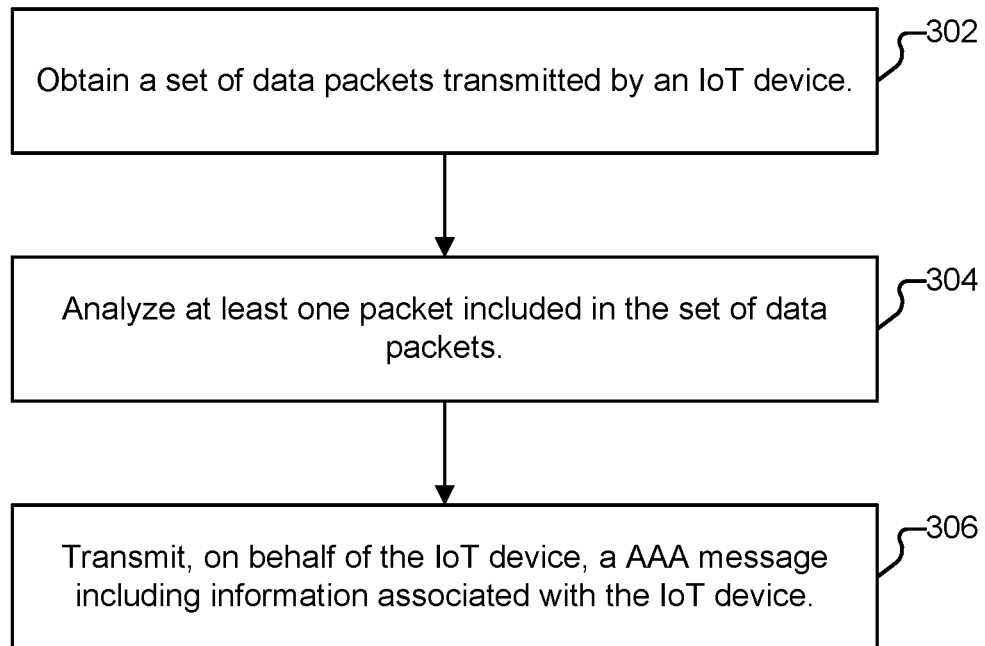
FIG. 3 illustrates an embodiment of a process for passively providing AAA support for an IoT device in a network.

FIG. 3 illustrates an embodiment of a process for passively providing AAA support for an IoT device in a network. In various embodiments, process 300 is performed by IoT server 134. The process begins at 302 when a set of packets transmitted by an IoT device is obtained. As one example, when whiteboard 146 is first provisioned on network 110, such packets can be passively received by IoT server 134 at 302. Packets can also be received at 302 during subsequent use of whiteboard 146 (e.g., as Alice has whiteboarding sessions with Bob via whiteboard 144). At 304, at least one packet included in the set of data packets is analyzed. As one example of the processing performed at 304, IoT server 134 determines that the packets received at 302 are being transmitted by whiteboard 146. One action that IoT server 134 can take is to identify whiteboard 146 as a new IoT device on network 110 and obtain contextual information from IoT module 138 if available. At 306, IoT server 134 transmits, on behalf of the IoT device, a AAA message that includes information associated with the IoT device. An example of such a message is shown in FIG. 4A. As previously mentioned, whiteboard 146 does not support the RADIUS protocol. However, IoT server 134 can generate a message such as is depicted in FIG. 4A (e.g., using information received at 302 and also from security platform 140 as applicable) on behalf of whiteboard 146. As previously mentioned, when IoT server 134 provides information about whiteboard 146 to IoT module 138, IoT module 138 can take a variety of actions such as creating a record for whiteboard 146 in database 160 and populating that record with contextual information about whiteboard 146 (e.g., determining its manufacturer, model number, etc.). As additional contextual information about whiteboard 146 is gathered by security platform 140, its profile can be updated and propagated to data appliance 102. When whiteboard 146 is initially provisioned within network 110, no additional contextual information may be available (e.g., security platform 140 may not have such additional information, or, providing such information by security platform 140 to IoT server 134 may not be instant). Accordingly, and as is depicted in FIG. 4A, the RADIUS message generated by IoT server 134 on behalf of whiteboard 146 may include limited information. As additional contextual information is received (e.g., by IoT server 134 from IoT module 138), subsequent RADIUS messages sent by IoT server 134 on behalf of whiteboard 146 can be enriched with such additional information. Examples of such subsequent messages are illustrated in FIGS. 4B and 4C. FIG. 4B illustrates an example of a RADIUS message that IoT server 134 can send on behalf of whiteboard 146 once contextual information about whiteboard 146 has been provided by IoT module 138 (e.g., which contains a database of contextual information about a wide variety of IoT devices). In the example shown in FIG. 4B, contextual information such as the manufacturer of the whiteboard (Panasonic) and the nature of the device (e.g., it is an interactive whiteboard) is included. Such contextual information can be used by AAA servers such as AAA server 156 to provide AAA services to whiteboard 146 (without having to modify whiteboard 146), such as by automatically provisioning it on a subnetwork dedicated to teleconferencing equipment. Other types of IoT devices can also be automatically grouped based on attributes such as device type, purpose, etc. (e.g., with critical surgical equipment automatically provisioned on a subnetwork dedicated to such equipment and thus isolated from other devices on the network). Such contextual information can be used to enforce policies such as traffic shaping policies, such as a policy giving preferential treatment to whiteboard 146's packets over social networking packets (e.g., as determined using APP-ID). Fine grained policies could similarly be applied to communications with critical surgical equipment (e.g., preventing any device in communication with such equipment from having an out of date operating system, etc.). In the example shown in FIG. 4C, yet more additional contextual information is included by IoT server 134 in RADIUS messages on behalf of whiteboard 146. Such additional contextual information includes additional attribute information such as the device model, operating system, and operating version. When whiteboard 146 is initially provisioned in network 110, all of the contextual information depicted in FIG. 4C will likely not be available. As whiteboard 146 is used within network 110 over time, additional contextual information can be collected (e.g., as IoT server 134 continues to passively observe packets from whiteboard 146 and provide information to security platform 140). This additional information can be leveraged (e.g., by data appliance 102) to enforce fine grained policies. As one example, as shown in FIG. 4C, whiteboard 146 runs a particular operating system that is Linux-based and has a version of 3.16. Frequently, IoT devices will run versions of operating systems that are not upgradable/not patchable. Such devices can pose security risks as exploits are developed for those operating systems. Data appliance 102 can implement security policies based on contextual information such as by isolating IoT devices having out of date operating systems from other nodes in network 110 (or otherwise limiting their access) while permitting less restrictive network access to those with current operating systems, etc.

FIGS. 4A-4C depict examples of RADIUS access request messages. As applicable, IoT server 134 can generate a variety of types of RADIUS messages on behalf of whiteboard 146. As one example, RADIUS accounting start messages can be triggered when traffic from whiteboard 146 is first observed. Periodic RADIUS accounting interim update messages can be sent while the whiteboard is in use, and RADIUS accounting stop messages can be sent when whiteboard 146 goes offline.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   receive, at a first time, a set of data packets transmitted by an Internet of Things (IoT) device;
   determine, at least in part by analyzing at least one packet included in the set of data packets, a first Authentication, Authorization, and Accounting (AAA) message to transmit on behalf of the IoT device;
   transmit, on behalf of the IoT device, the first AAA message; and
   receive, at a second time, an additional set of packets transmitted by the IoT device and transmit, on behalf of the IoT device, a second AAA message that includes at least one piece of contextual information associated with the IoT device that was not included in the first AAA message; and
   a memory coupled to the processor and configured to provide the processor with instructions.

2. The system of claim 1, wherein receiving the set of data packets includes performing passive monitoring.

3. The system of claim 1, wherein analyzing the at least one packet includes using deep packet inspection to identify transaction data.

4. The system of claim 1, wherein the processor is further configured to obtain a set of attributes associated with the IoT device.

5. The system of claim 4, wherein obtaining the set of attributes includes querying a remote IoT module.

6. The system of claim 1, wherein analyzing the at least one packet includes determining that the at least one packet is associated with the IoT device.

7. The system of claim 1, wherein analyzing the at least one packet includes determining that the at least one packet is associated with a device not previously seen in a network environment.

8. The system of claim 1, wherein analyzing the at least one packet includes determining that the at least one packet is associated with a new connection.

9. The system of claim 1, wherein the first AAA message is a RADIUS access request message.

10. The system of claim 1, wherein the first AAA message is a RADIUS accounting start message.

11. The system of claim 1, wherein the first AAA message is a RADIUS accounting stop message.

12. The system of claim 1, wherein the first AAA message is transmitted in response to receipt of initial attribute information associated with the IoT device.

13. The system of claim 1, wherein the second AAA message is transmitted in response to receipt of subsequent attribute information associated with the IoT device.

14. A method, comprising:
   receiving, at a first time, a set of data packets transmitted by an Internet of Things (IOT) device;
   determining, at least in part by analyzing at least one packet included in the set of data packets, a first Authentication, Authorization, and Accounting (AAA) message to transmit on behalf of the IoT device;
   transmitting, on behalf of the IoT device, the first AAA message; and
   receiving, at a second time, an additional set of packets transmitted by the IoT device and transmitting, on behalf of the IoT device, a second AAA message that includes at least one piece of contextual information associated with the IoT device that was not included in the first AAA message.

15. A computer program product embodied in a tangible computer readable storage medium and comprising computer instructions for:
   receiving, at a first time, a set of data packets transmitted by an Internet of Things (IoT) device;
   determining, at least in part by analyzing at least one packet included in the set of data packets, a first Authentication, Authorization, and Accounting (AAA) message to transmit on behalf of the IoT device;
   transmitting, on behalf of the IoT device, the first AAA message; and
   receiving, at a second time, an additional set of packets transmitted by the IoT device and transmitting, on behalf of the IoT device, a second AAA message that includes at least one piece of contextual information associated with the IoT device that was not included in the first AAA message.

16. The method of claim 14, wherein receiving the set of data packets includes performing passive monitoring.

17. The method of claim 14, wherein analyzing the at least one packet includes using deep packet inspection to identify transaction data.

18. The method of claim 14, further comprising obtaining a set of attributes associated with the IoT device.

19. The method of claim 18, wherein obtaining the set of attributes includes querying a remote IoT module.

20. The method of claim 14, wherein analyzing the at least one packet includes determining that the at least one packet is associated with the IoT device.

21. The method of claim 14, wherein analyzing the at least one packet includes determining that the at least one packet is associated with a device not previously seen in a network environment.

22. The method of claim 14, wherein analyzing the at least one packet includes determining that the at least one packet is associated with a new connection.

23. The method of claim 14, wherein the first AAA message is a RADIUS access request message.

24. The method of claim 14, wherein the first AAA message is a RADIUS accounting start message.

25. The method of claim 14, wherein the first AAA message is a RADIUS accounting stop message.

26. The method of claim 14, wherein the first AAA message is transmitted in response to receipt of initial attribute information associated with the IoT device.

27. The method of claim 14, wherein the second AAA message is transmitted in response to receipt of subsequent attribute information associated with the IoT device.

* * * * *